(12) United States Patent
Ahm

(10) Patent No.: US 7,334,368 B1
(45) Date of Patent: Feb. 26, 2008

(54) METHOD OF GERMINATING SEEDS OR THE LIKE GROWTH-SUITED PARTS OF A PLANT CONTAINED IN GERMINATING UNITS, AS WELL AS A GERMINATING BOX AND A GERMINATING ASSEMBLY FOR USE WHEN CARRYING OUT THE METHOD

(75) Inventor: Poul Henrik Ahm, Altea (ES)

(73) Assignee: Bentle Products AG, Zug (CH)

( * ) Notice: Subject to any disclaimer, the term of this patent is extended or adjusted under 35 U.S.C. 154(b) by 0 days.

(21) Appl. No.: 09/720,590

(22) PCT Filed: Jun. 23, 1999

(86) PCT No.: PCT/DK99/00352

§ 371 (c)(1),
(2), (4) Date: Dec. 22, 2000

(87) PCT Pub. No.: WO00/00006

PCT Pub. Date: Jan. 6, 2000

(30) Foreign Application Priority Data

Jun. 29, 1998 (DK) ............................... 1998 00841

(51) Int. Cl.
*A01G 31/02* (2006.01)
(52) U.S. Cl. ........................................... 47/61
(58) Field of Classification Search ............... 47/61, 47/56, 60, 62 N, 59 R, 64, 58.1 R, 62 R; 111/149
See application file for complete search history.

(56) References Cited

U.S. PATENT DOCUMENTS

| | | | | |
|---|---|---|---|---|
| 2,198,150 | A | * 4/1940 | Barnhart | 47/62 R |
| 3,848,359 | A | * 11/1974 | Seith et al. | 239/145 |
| 3,920,144 | A | * 11/1975 | Callen | 220/533 |
| 4,356,664 | A | * 11/1982 | Ruthner | 47/65 |
| 4,910,911 | A | * 3/1990 | Ahm | 47/56 |

(Continued)

FOREIGN PATENT DOCUMENTS

EP 0182263 4/1990

(Continued)

*Primary Examiner*—Son T. Nguyen
(74) *Attorney, Agent, or Firm*—Cooper & Dunham LLP

(57) ABSTRACT

A zigzag folded tape is used for joining germinating units that contain seeds or the like-growth-suited parts of a plant. In addition to a seed or the above parts of a plant, the germinating units comprise a mixture of a carrier and additives with water-absorbing substances. The tape is placed edgewise in a germinating box (7). Then the germinating box (7) is placed in an irrigation room (21) associated with the germinating assembly (15). The irrigation room (21) comprises a support (18) for the germinating boxes. The germinating boxes are soaked in successive irrigation periods interrupted by breaks. The soaking is stopped when the tape is saturated with water and the water drips heavily from the bottom side of the germinating box. The germinating box (7) is then moved with the tape to the germinating room (23) associated with the germinating assembly (15), in which it is subjected to a climate necessary for an optimum germination, viz. climatic conditions such as temperature, moisture and light conditions. The germination is interrupted by removing the germinating box from the germinating room. The box is cooled and/or transferred for a direct bedding out of the tape.

6 Claims, 3 Drawing Sheets

U.S. PATENT DOCUMENTS 5,184,420 A * 2/1993 Papadopoulos et al. ..... 47/62 N
6,035,578 A * 3/2000 Lo et al. ......................... 47/61
6,508,033 B2 * 1/2003 Hessel et al. ................... 47/60

FOREIGN PATENT DOCUMENTS

| | | |
|---|---|---|
| EP | 0823203 | 2/1998 |
| JP | 409308377 A * | 12/1997 |
| JP | 410215701 A * | 8/1998 |
| JP | 410295198 A * | 11/1998 |
| JP | 411137098 A * | 5/1999 |
| JP | 2000023574 A * | 1/2000 |

* cited by examiner

| | |
|---|---|
| 1 | Placing of zigzagged tapes with germinating units in a germinating box with a grate-like bottom |
| 2 | Placing of the germinating-box in a germinating assembly with a grate-like bottom |
| 3 | Soaking of the tape in successive irrigation periods |
| 4 | Subjecting the tape to a climate optimum for the germination |
Fig. 1
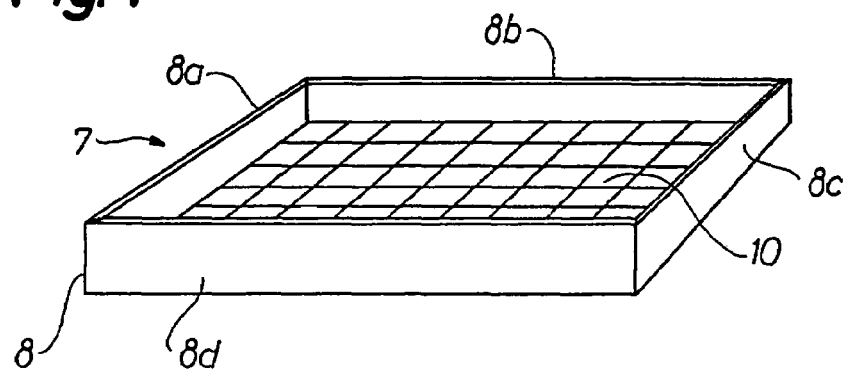
Fig. 2
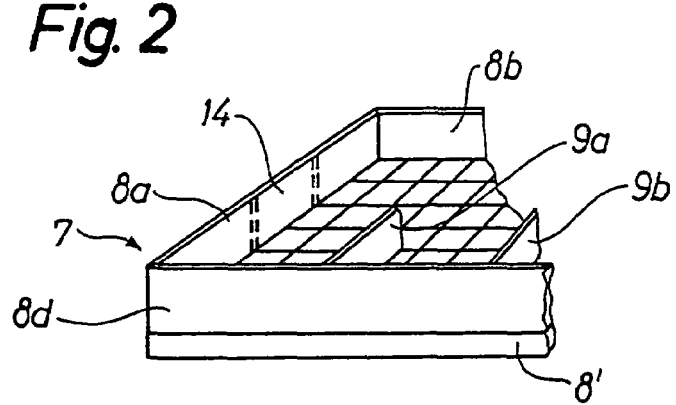
Fig. 3

METHOD OF GERMINATING SEEDS OR THE LIKE GROWTH-SUITED PARTS OF A PLANT CONTAINED IN GERMINATING UNITS, AS WELL AS A GERMINATING BOX AND A GERMINATING ASSEMBLY FOR USE WHEN CARRYING OUT THE METHOD

TECHNICAL FIELD

The invention relates to a method of the type stated in the introductory clause of claim 1.

BACKGROUND ART

The term "germinating unit" is here to be construed as a unit formed by two thin material layers, such as paper layers, comprising at least one seed, carriers, additives and a binder.

The term "seed" is here to be construed as a seed germinated in such a manner that the radicle has penetrated the seed coat in most cases. By the term plant is here meant a seed or the like growth-suited part of a plant germinated or developed in such a manner that it comprises a top with leaves and a root.

One of the advantages obtained by subjecting a seed tape to a germinating process prior to the bedding out is that the germination can proceed under optimum conditions, i.e. by involving a minimum amount of storing nutrition from the seed. The latter is of importance for each seed, as said seed possesses a maximum residual energy for the further development of the plant. The maximum residual energy of the seed has a positive effect on the plant during its entire life, especially when it is a question of its capacity of protecting itself against diseases and to some extent also against insects. A further advantage is found in the fact that a seed germinated prior to the bedding out or a plant developed prior to said bedding out is many days, approximately 10 to 12 days, ahead of weeds, which cannot develop until a while after the bedding out of the germinated seed or plant tape.

In EP-A-0823203 is disclosed a method of germinating seeds contained in germinating units joined by way of tape, the germinating units further comprising a mixture of a carrier and additives including water-absorbing substances. A zigzag folded tape is placed edgewise on a gratelike support in an irrigation and germinating room where it is subjected to successive irrigation periods interrupted by breaks until the first leaves start to grow. The tape is then immersed into the germinating fluid and after the completion of germination from all the seeds the tape is cooled down in the irrigation and germinating room.

Interest has long been attached to the possibility of making the germinating process more efficient on the germinating units available in tapes than hitherto known.

BRIEF DESCRIPTION OF THE INVENTION

The object of the invention is to solve the above problem.

The method according to the invention is characterised in the features stated in the characterising clause of claim 1.

As a result, a very efficient germination of each seed is obtained because each germinating unit is advantageously soaked to the maximum extent until it is saturated with the germinating fluid, viz. until the fluid drips from the box. Most of the remaining water is simultaneously absorbed by the water-absorbing substances of the germinating units with the result that at least 20% by volume of air is provided in the pore volume of the germinating unit, said state being maintained by means of osmotic forces. This air volume is important for the oxygen uptake of the seed, viz. the respiration process. The zigzag folding renders it simultaneously possible to obtain a substantially uniform distribution of the germinating fluid in the germinating units, especially in the height of each germinating unit.

According to the invention the water added in the irrigation room may be adjusted to a pH of 6.1 to 6.3. According to a separate embodiment of the method the adjustment may be made by means of phosphoric acid.

In addition, the tape may according to the invention be transferred prior to the interruption of the germination to a growing room with a controlled temperature, a controlled moisture and a controlled light intensity, whereby the tape can be supplied with a nutritive fluid containing an optimum amount of nutrients for the plants. In this manner an optimum way of developing true plants is obtained. The nutritive fluid is here typically added once a day. One of the nutrients may according to the invention be an excess of phosphorus.

Moreover it is according to the invention possible prior to the termination of the attraction of plants to subject said plants to a hardening off, whereby the resulting plants are forced to increase their number of roots with the result that an improved water intake of the plants after the bedding out is ensured.

The invention relates also to a germinating box for use when carrying out the method according to the invention, and this germinating box is characterised in that it comprises a frame formed by side members and end members as well as a grate-like bottom secured to the bottom rim of said frame, where the frame comprises a dispensing opening in one of the end members, said dispensing opening allowing the germinated tape to be pulled out of the germinating box through said opening. This germinating box turned out to be particularly efficient because it reliably supports the tape placed edgewise, and when the germination has been terminated the tape can be moved while placed in said germinating box to a bedding machine, where said tape is pulled through the above dispensing opening during the bedding out. As the bottom of the germinating box is gratelike, the excess germinating fluid originating from the soaking can easily run out of said box. In addition, the gratelike bottom ensures that the roots of the plants only extend a few mm below the gratelike bottom, at which length said roots are singed due to a too high evaporation. As a result, the roots of the plants are homogeneous with the effect that a favourable bedding out is ensured.

According to the invention the inner surfaces of the germinating box as well as the delimitations of the dispensing opening may be smooth without protruding projections. In this manner the tape can be pulled out of the germinating box through the dispensing opening in a particularly easy manner when said tape is to be bedded out.

The germinating box is inclined during the bedding out, and in order to avoid an unintentional sliding downwards of the entire tape towards the dispensing opening, the inner surfaces of said germinating box may, however, also be rough, and a plurality of removable ribs may be provided substantially parallel to the end member that can be opened, said ribs projecting from both sides of the box towards the interior of said box and being of the same height as the frame and a length corresponding to approximately ⅓ of the length of the end member of the box.

According to the invention the germinating box may be moulded of plastics. The resulting germinating box is both inexpensive to produce and easy to clean in order to be reused. Finally, the frame may according to the invention below the gratelike bottom comprise a rim portion projecting downwards. In this manner the gratelike bottom is protected to a predetermined degree as it cannot be damaged by the previously described support when the germinating box is placed thereon. In addition, water does not accumulate below the gratelike bottom, but instead a free access of air to the bottom side of the tape is provided in the germinating box. Said rim portion projecting downwards may according to the invention have a height of approximately 2 cm.

BRIEF DESCRIPTION OF THE DRAWINGS

The invention is explained in detail below with reference to the accompanying drawing, in which FIG. 1 is a diagrammatic view of the individual steps of the method according to the invention, FIG. 2 is a perspective view of a germinating box according to the invention, where the gratelike bottom of the box appears clearly, FIG. 3 corresponds to FIG. 2, but here the dispensing opening of the germinating box appears clearly.

BEST MODE FOR CARRYING OUT THE INVENTION

Figure 4:
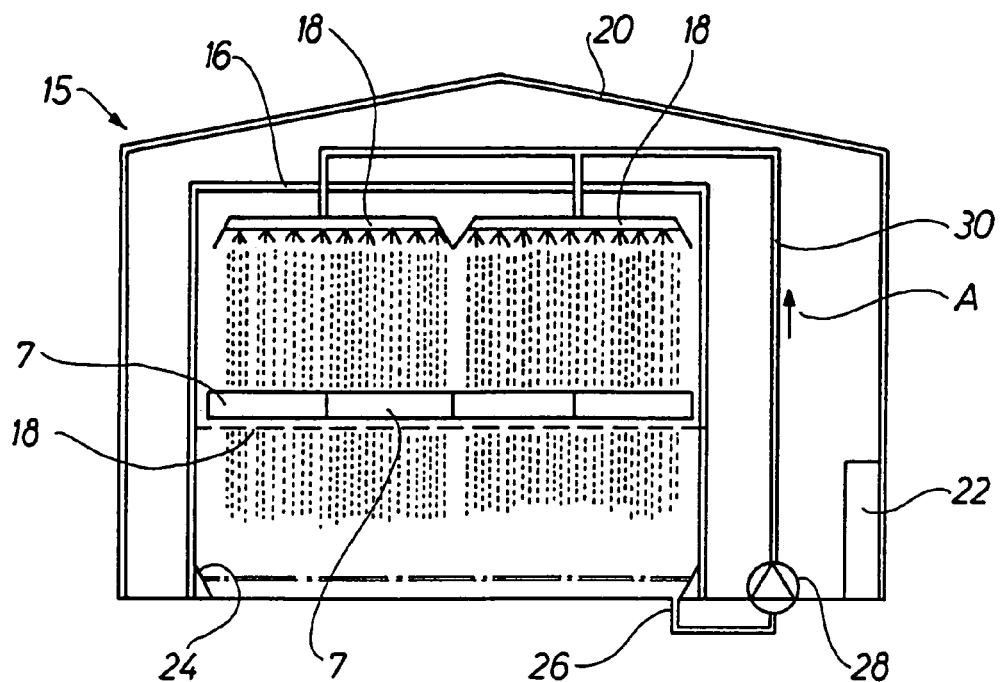
FIG. 4 is a diagrammatic end view of a germinating assembly according to the invention.

In FIG. 1 the reference numerals 1, 2, 3 and 4 indicate the most important steps of the method according to the invention. 1 indicates the step where a zigzagged tape with germinating units is placed in a germinating box with a gratelike bottom. 2 indicates the step where the germinating box comprising the zigzagged tape with germinating units is placed on a support in a germinating assembly. 3 indicates the step where the tape is subsequently soaked with water in successive irrigation periods in such manner that the germinating box is sprayed with germinating fluid until the spraying is interrupted by breaks. 4 indicates the succeeding step where the tape placed in a germinating room is subjected to a climate optimum for a germination, viz. a climate optimized preferably with respect to temperature, moisture and light conditions. The germination is interrupted by the germinating box being removed from the germinating room, cooled and/or transferred for a direct bedding out of the tape.

The germinating box 7 of FIG. 2 is used for carrying out the method according to the invention and comprises a frame 8 with end walls 8a and 8c and side walls 8b and 8d. A gratelike bottom 10 is secured to the bottom rim of the frame. The aperture of the gratelike bottom is typically 10 to 40 mm. As illustrated at 8' in FIG. 3, a rim portion 8' projecting down-wards can be secured to the bottom side of the frame. This rim portion 8' serves to maintain a distance between the gratelike bottom 10 and a surface on which the germinating box 7 may be placed.

As also indicated in FIG. 3, the frame 8 can be provided with a dispensing opening 14 in the end wall 8a, the completely germinated tape being pulled out through said dispensing opening during the bedding out. The dispensing opening 14 is, however, not shown in detail as it can be established in many different ways.

In FIG. 3, the delimitations of the dispensing opening 14 are smooth without projections, and optionally rounded. The germinating box can be made of many different materials, but the most advantageous germinating box is moulded and made of plastics. In the latter case the gratelike bottom 10 is formed by thin plastic ribs. Removable ribs 9a, 9b can extend from the side walls 8d and towards the interior of the frame, cf. FIG. 3. The ribs are preferably of an upwardly pointed cross section. Correspondingly, removable ribs can extend from the opposite side wall 8b.

Figure 5:
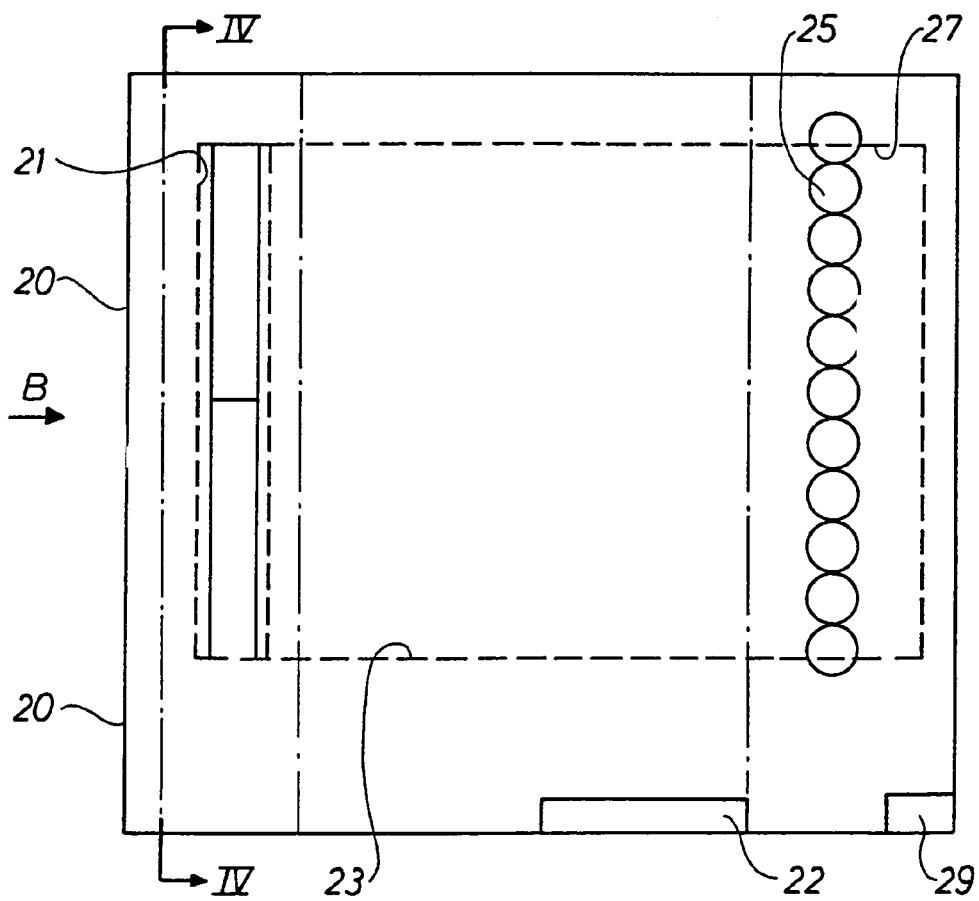
FIG. 5 is a top view of the germinating assembly of FIG. 4.

FIGS. 4 and 5 show a germinating assembly 15, which can be used for carrying out the method according to the invention. This germinating assembly comprises an irrigation room 21, in which a stand 16 is provided. A perforated support 18, such as a grate, is placed on the stand 16, said grate serving to support one or more germinating boxes 7, four boxes being provided in the illustrated embodiment. At least one row 12 of water spraying nozzles is placed on the stand 16 above and at a distance of the germinating boxes 7 for spraying said germinating boxes 7 with germinating fluid. The illustrated embodiment involves two rows of water spraying nozzles.

The germinating assembly is also associated with a germinating room 23 with a covering structure 20. The structure 20 can be common to the rooms 21 and 23 or be provided for the room 23 only. The structure 20 is provided with a climatic control unit 22 for controlling the composition of the air, the relative moisture, temperatures and light conditions, said parameters preferably being maintained at a constant high level. The climatic control unit is also diagrammatically indicated.

As show, a catching trough 24 can be provided below the support 18 for the catching of excess germinating fluid. This trough comprises an outlet 26, through which the water in the trough can be returned to the irrigation rows 12 by means of a pump 28 and a recirculation pipe 30 through a cleaning assembly not shown, in which the germinating gluid is cleansed from disease germs. The flow direction of the water through the pipe 30 is indicated by the arrow A.

It appears clearly from FIG. 4 how an amount of the germinating fluid sprayed from the rows 12 rains downwards through the boxes 7. The excess water penetrates through the support 18 and further downwards into the trough 24.

It should be noted concerning the climate provided by the climatic control unit inside the greenhouse that as far as germination of beet seeds is concerned this climate is as follows:

The temperature is in the range of 18 to 21° C., the relative moisture is kept at 96 to 98%, and the light conditions 120 to 160 W/m$^2$. As indicated, a growing room 27 may be provided in which a nozzle irrigation system 25 is provided for sprinkling the germinating boxes 7 with water admixed nutrients. The sprinkled water drops can be rather large. The room 27 is provided with its own climatic control unit 29 for controlling the temperature, moisture and light intensity of the room. The room 27 allows a germination up to the plant stage of the seed or of the like growth-suited parts of a plant contained in the germinating units in the boxes 7.

Figure 6:
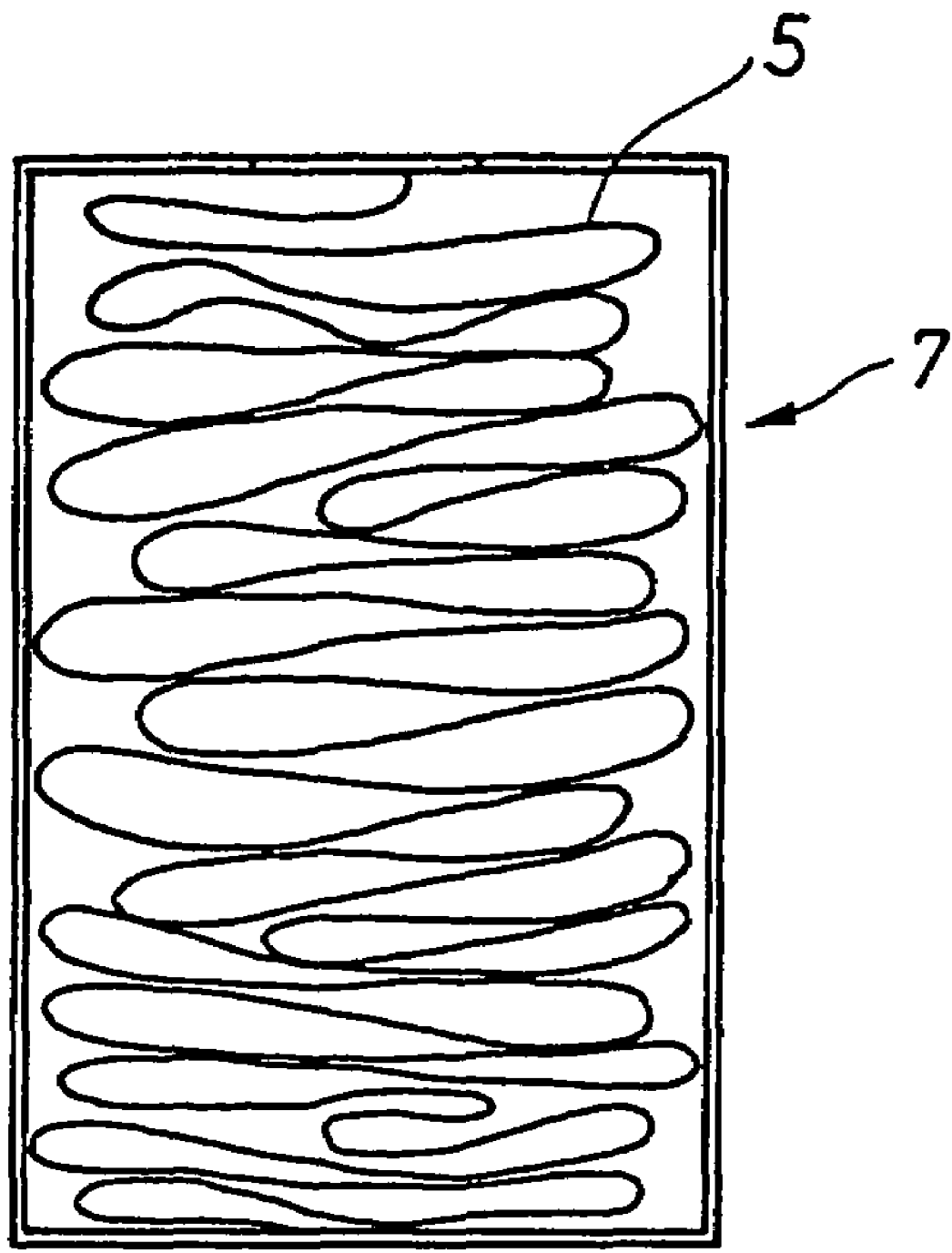
FIG. 6 is a diagrammatic top view of a germinating box and clearly showing how the tape is placed edgewise and folded up in a zigzag way.

Concerning the placing of the tape with germinating units in the germinating box it should be noted that the tape 5 is placed edgewise, cf. the diagrammatic view of FIG. 6 also showing the zigzags of said tape. Concerning the method according to the invention it should be noted that the soaking of the tapes in the germinating boxes 7 in the room 21 is carried out in successive irrigation periods interrupted by breaks. An irrigation period lasts typically 5 minutes, and a break lasts typically approximately 3 minutes. After an irrigation for approximately 15 to 20 minutes involving a water consumption of 5 to 6l per germinating box in the room 21, the germinating boxes 7 are moved into the germinating room 23 in which they typically stay for approximately 2 to 3 days. Before the germination is completed, the germinating boxes 7 are removed from the germinating room 23, cooled and/or transferred for a direct bedding out of the tape. As an alternative, the germinating boxes can be moved into the growing room 27. Here the germinating boxes 7 are subjected to a sprinkling with water admixed nutrients and an excess of phosphorous at regular intervals by means of the nozzle irrigation system 25. The sprinkling in the room 27 is typically carried out once a day. The nozzle irrigation system 25 is connected to a recirculation system not shown for the nutritive fluid. This recirculation system corresponds substantially to the one shown in connection with the room 23.

When the germinating units are made of paper, care is usually taken that the paper possesses a suitably high wet strength.

The invention may be modified in many ways without thereby deviating from the scope of the invention as defined in the appended claims.

The invention claimed is:

1. A method of germinating seeds or other growth-suited plant parts comprising the steps of:
   enclosing the seeds or other growth-suited plant parts in germinating units,
   joining the germinating units by way of a tape, the germinating units employing a mixture of a carrier and additives including a water-absorbing substance,
   placing the tape in a zigzag fold in a germinating box that includes sidewalls and a gratelike support for the tape;
   reconfiguring the interior of the germinating box by inserting or removing one or more removable ribs in the germinating box, each rib extending from a side wall and stopping approximately ⅓ of the distance to an opposite wall;
   placing the germinating box in an irrigation room and establishing a first controlled environmental condition including a climate adapted for irrigation;
   irrigating the tape by saturating it with a spray of germinating fluid which is free of disease germs and provides the tape with a desired pH and nutrient content;
   interrupting the irrigation when the tape is saturated with germinating fluid and said germinating fluid drips from the bottom side of the germinating box through the gratelike support;
   moving the germinating box with the tape from the irrigation room to a separate germinating room and establishing a second controlled environmental condition different from said first controlled environmental condition; said second controlled environmental condition including a climate adapted for germinating;
   interrupting the germination by removing by the germinating box from the germinating room; and
   bedding out the tape from the germinating box.

2. A method as claimed in claim 1, comprising adjusting the water added in the irrigation room to a pH of 6.1 to 6.3.

3. A method as claimed in claim 2, comprising using phosphoric acid to make the adjustment.

4. A method as claimed in claim 1, comprising transferring the tape prior to the interruption of the germination to a growing room with a controlled temperature, moisture and light intensity, and supplying the tape with a nutritive fluid containing an amount of nutrients optimum to the plants.

5. A method as claimed in claim 4, comprising supplying, as one of the nutrients, an excess of phosphorous.

6. A method as claimed in claim 4, further comprising hardening off the plants.

* * * * *